Figure 1:
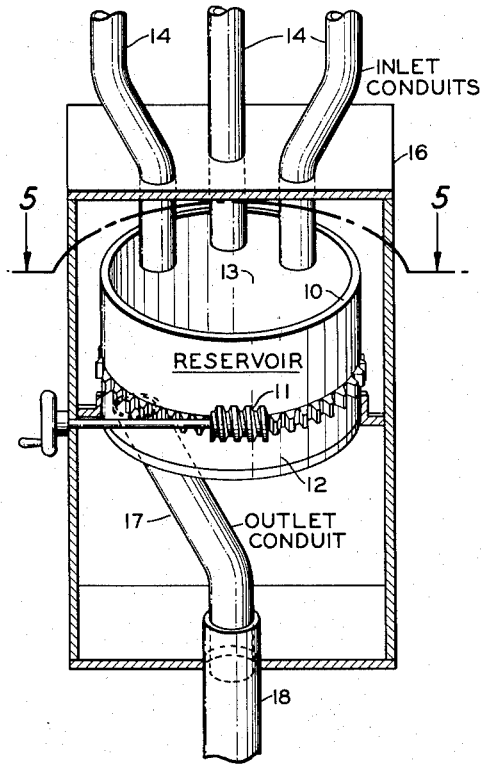

Jan. 3, 1956 — C. E. ALLEMAN — 2,729,547
SOLIDS FLOW CONTROL APPARATUS
Filed April 24, 1950 — 2 Sheets-Sheet 1

INVENTOR.
C. E. ALLEMAN
BY Hudson and Young
ATTORNEYS

Jan. 3, 1956 C. E. ALLEMAN 2,729,547
SOLIDS FLOW CONTROL APPARATUS
Filed April 24, 1950 2 Sheets-Sheet 2

INVENTOR.
C. E. ALLEMAN
BY Hudson and Young
ATTORNEYS

United States Patent Office 2,729,547
Patented Jan. 3, 1956

2,729,547

SOLIDS FLOW CONTROL APPARATUS

Carl E. Alleman, Etter, Tex., assignor to Phillips Petroleum Company, a corporation of Delaware Application April 24, 1950, Serial No. 157,665

10 Claims. (Cl. 23—284)

This invention relates to the control of flow of flowable particulate solids. In one embodiment this invention relates to process and apparatus for regulating the flow of a contiguous mass of flowable particulate solids. In another embodiment this invention relates to the flow of solids from selected points within a contiguous mass of flowable particulate solids, and for control of such flow. In still another embodiment, this invention relates to control of pebble flow through a pebble heater system.

This application is a continuation-in-part of copending application Serial No. 123,266, filed October 24, 1949, now Patent No. 2,572,758.

Various means have been proposed in the art for regulating flow of flowable particulate solids. Typical of such well-known means are those involving screw conveyors, star valves, and similar devices utilizing continuously moving parts. Such devices are necessarily fabricated of special alloys offering the necessary resistance to strong abrasive effects of the moving solids on the moving parts, and to provide resistance to wear from movement of the parts. Such fabricating materials are costly and depreciate at a high rate and are expensive to maintain. Furthermore, a temperature at which such devices can be operated is limited generally to a level not higher than from 600 to 800° F. by virtue of the increase in the amount of wear on the moving parts incurred at such high temperatures. Another limitation on the temperature at which such devices can be utilized is the tensile strength of the fabricating material which, of course, decreases with increasing temperatures.

In many instances it is desired to withdraw flowable solids from a solids system, at a plurality of separate points within a solids mass therein, often for the reason that solids in different zones of the mass are at different temperatures and can be utilized in effecting heat transfer in subsequent heat transfer steps at different temperature levels. Thus, it is often advantageous to provide hot solids for a plurality of separate simultaneous heat transfer steps effected at different temperature levels by withdrawing solids at those different requisite temperatures from selected points within a single mass of hot solids. In other instances solids in one portion of a hot particulate solids mass are contacted more extensively with reactant gases than are solids in another portion, thus requiring regulation of solids flow from each of those separate portions to compensate for the uneven contacting. In other instances solids in one portion of the mass may be laden with relatively large amounts of carbonaceous matter and can be advantageously withdrawn at such a time instead of later.

My invention is concerned with process and apparatus for controlling flow of solids from a contiguous mass of particulate flowable solids at a plurality of predetermined points therein, wherein no continuously moving equipment parts are required, and the flowing solids can be handled at temperatures as high as from 800 to 1200° F. or higher. My invention further provides for the use of more readily available and relatively inexpensive fabricating materials in controlling such solids flow than can be used in the construction of a solids flow controller of the type involving the use of continuously moving parts.

Although my invention is well applied to the control of solids flow from a plurality of points within a contiguous mass of flowable particulate solids of any type, it is particularly advantageous as applied to control of flow of such solids while at a temperature as high as from 800 to 1200° F., or higher. Accordingly, I have applied my invention in a preferred embodiment to the control of flow of pebbles from a plurality of points within a pebble mass in a pebble heater system, wherein in many instances it is advantageous to discharge pebbles from the pebble heater apparatus at temperatures as high as from 800 to 1200° F., as for example when cracking ethane or propane to produce olefins.

A pebble heater system, or pebble heater apparatus as it is often referred to, usually comprises a series of substantially vertically-extending zones, often in vertical alignment with each other. Usually two such zones are employed and are connected by a relatively narrow interconnecting zone, or throat. The top or upper zone is commonly referred to as the pebble heating chamber and the lower zone as the gas reaction or gas heating chamber. A combustion zone, or chamber, is positioned adjacent or in close proximity to the sides of the lower portion of the heating chamber. Combustion gas from the combustion chamber is passed through the mass of pebbles in the pebble heating chamber. A hot gas source other than a combustion chamber is sometimes employed. A contiguous mass of particulate contact material, often referred to as pebbles, fills the pebble heating zone, the interconnecting zone or throat, and the gas reaction or heating zone, and flows downwardly through these zones by gravity. Pebbles are discharged from the bottom of the gas reaction zone at a controlled rate, and returned, usually by elevating means, to the inlet in the upper portion of the pebble heating zone. A contiguous moving pebble mass thereby fills the pebble heating zone, gas reaction, or heating zone, and the interconnecting zone, or throat, at all times. The term "pebbles" as used throughout the specification denotes any solid refractory material of flowable form and size that can be utilized to carry heat from one zone to another. Pebbles are preferably substantially spherical and about $\frac{1}{32}$ inch to 1 inch in diameter, the preferred range being about $\frac{1}{4}$ inch to $\frac{1}{2}$ inch. Pebbles are formed of a refractory material which will withstand temperatures at least as high as the highest temperature attained in the pebble heating chamber, and must be capable also of withstanding temperature changes within the apparatus. Refractory materials such as metal alloys, ceramics, or other satisfactory material may be utilized to form such materials. Silicon carbide, alumina, periclase, thoria, beryllia, Stellite, zirconia, and mullite may be satisfactorily used to form such pebbles or may be used in admixture with each other or with other materials. Pebbles formed of such materials, when properly fired, serve very well at high temperatures. Some pebbles, such as mullite-alumina pebbles, withstand temperatures up to about 3500° F. Pebbles which are used may be either inert or catalytic, as used in any selected process.

Pebble heater apparatus is generally employed in the thermal treatment or conversion of reactant materials, often hydrocarbons. Operation of such a pebble system generally involves circulating a contiguous pebble mass through the pebble heating chamber, interconnecting throat and reaction chamber. That portion of the pebble mass descending through the heating chamber is heated to a suitable predetermined temperature above a desired treating or conversion temperature in heat exchange relation with combustion gas or other hot gases from any desired source. Pebbles are often heated in the heating chamber to temperatures as high as from 2,000 to 3,000° F., and in some cases higher, dependent upon the temperature requirements of the subsequent treating step. The thus heated pebbles passing through the reaction chamber are contacted directly with the material to be treated or converted for a suitable contacting time to effect the desired treatment. The pebble mass having given up heat to the material treated in the treating zone descends through the bottom of the reaction chamber and is fed to an elevator for further handling, generally for transfer to an inlet at the top of the pebble heating chamber for reheating and recirculation through the system.

An object of my invention is to provide for the control of flow of flowable particulate solids.

Another object is to provide for a flow of solids from a plurality of predetermined points within a contiguous mass of flowable particulate solids, and for the control of such flow.

Another object is to provide apparatus for controlling a flow of flowable particulate solids from a plurality of selected points within a contiguous mass of such solids, at solids temperature as high as from 800 to 1200° F., and for effecting such a control of solids flow without the use of continuously moving equipment parts.

Another object is to provide process ad apparatus for controlling flow of pebbles from a plurality of selected points within a pebble mass in a pebble heater system.

Other objects will be apparent to those skilled in the art in the light of the accompanying discussion and disclosure.

In accordance with a broad embodiment of my invention, flow of solids from a contiguous flowable mass of particulate solids can be regulated by passing solids from such a mass through a plurality of downwardly extending inlet conduits in communication at their upper ends with the solids mass at selected predetermined points therein, and terminating in an upper portion of a solids reservoir, and withdrawing solids from a lower portion of the reservoir through a single outlet conduit having its inlet end adjustably movable with respect to the lower ends of the conduits described above. As discussed hereafter the amount of solids passed through each of the inlet conduits is controlled and regulated in accordance with the position of the upper end of the outlet conduit.

In one embodiment, apparatus of my invention comprises a rotatable solids reservoir, a plurality of downwardly extending conduits in communication at their upper ends with a mass of contiguous flowable particulate solids at separate points in the mass, and terminating in an upper portion of the reservoir, a single conduit extending downwardly from a lower portion of the reservoir to an outside point and having its upper end offset from the axis of rotation of the reservoir, and means for rotating the reservoir.

In another embodiment, apparatus of my invention comprises a solids reservoir adjustably movable in a lateral direction, a conduit extending from a fixed position in a lower portion of the reservoir to an outside point, a plurality of stationary conduits extending downwardly from a contiguous solids mass and terminating in the reservoir as discussed above, and means for moving the reservoir laterally and locking it in the position moved to.

Figure 2:
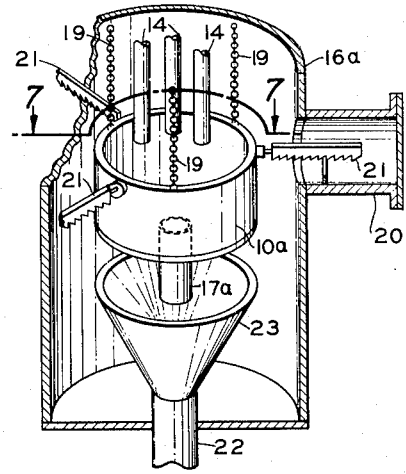
Figure 5:
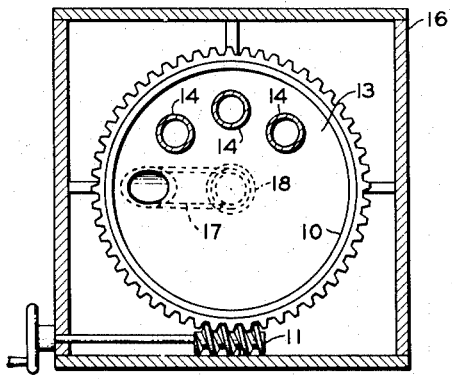
Figure 7:
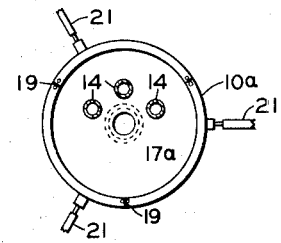
Figure 3:
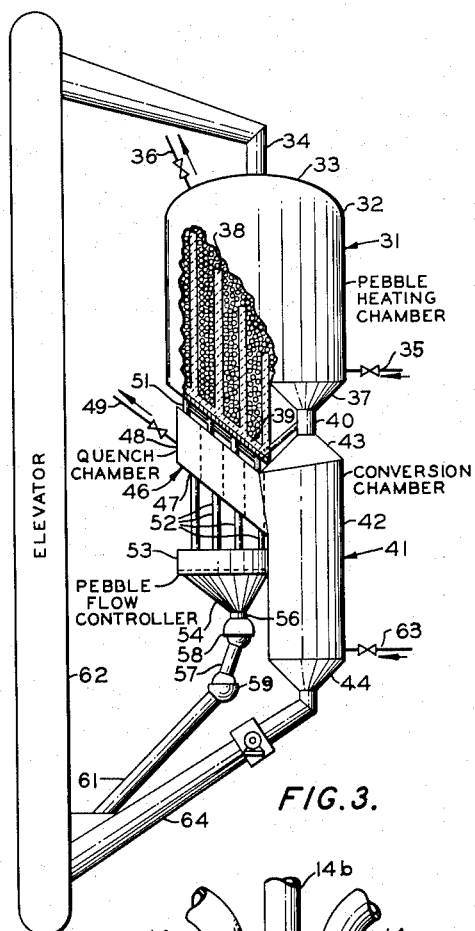
Figure 4:
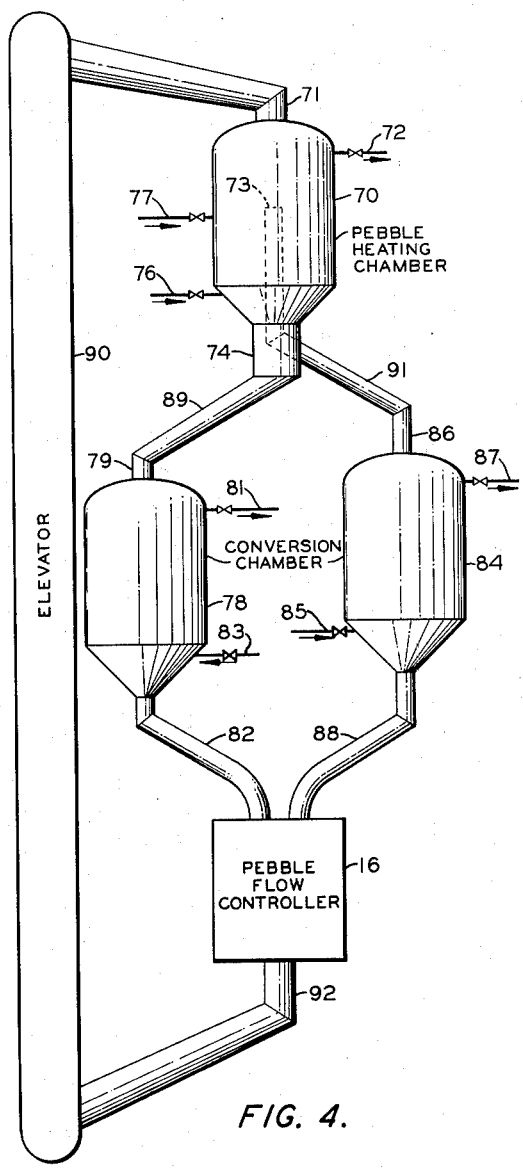
Figure 6:
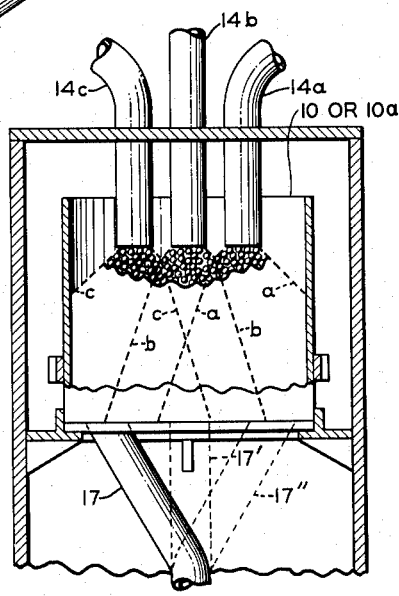

The accompanying diagrammatic drawings illustrate preferred forms of apparatus and process of my invention. It is to be understood that various modifications of the drawings may be made and still remain within the scope of my invention. Figure 1 is a perspective view, partly in cross-section of one form of apparatus of my invention. Figure 2 is a similar view of another form of preferred apparatus of my invention. Figure 3 is illustrative of a manner in which one form of the apparatus of the type illustrated in Figure 1 can be utilized, in the control of pebble flow from a plurality of points in a single mass of pebbles in a pebble heater system. Figure 4 is illustrative of still another manner in which the apparatus of either Figures 1 or 2 can be utilized in the control of pebble flow from a plurality of points in a single mass of pebbles in a pebble heater system. Figure 5 is a cross-sectional view taken along the line 5—5 of Figure 1, illustrating a preferred arrangement of the outlet ends of the solids inlet conduits in the pebble reservoir. Figure 6 is a diagrammatic illustration of a manner in which control of pebble flow is effected when either the rotatable pebble reservoir illustrated in Figure 1, or the laterally movable reservoir of Figure 2 is adjustably moved. Figure 7 is a cross-sectional view taken along the line 7—7 of Figure 2, further illustrating a spacing of the outlet ends of the inlet conduits in the reservoir to permit lateral adjustable movement of the reservoir.

Referring to Figure 1, solids reservoir 10, cylindrical and disposed in an upright position, in housing 16, is adjustably rotatable by rack and pinion means 11. Reservoir 10 has a closed bottom 12 and an open top 13. A plurality of first conduits 14 extend downwardly through the top of housing 16 into the open top of reservoir 10. Conduits 14 are in communication at their upper ends with solids, each at predetermined selected points within a contiguous mass of flowable particulate solids (not shown). The lower ends of conduits 14 preferably terminate on a locus of points describing an arc not exceeding about 180°, and having an axis common with the rotational axis of reservoir 10, although these conduits can terminate on a straight line, as described by a chord of a circle, or on any desired locus of points. Conduit 17 extends from a lower portion of reservoir 10 through bottom 12 to an external point. The upper end of conduit 17 is offset axially from the rotational axis of reservoir 10. The lower ends of conduits 14 terminate at a vertical distance from the inlet of conduit 17, of at least 5/8 of the radius of the arc above discussed.

When employing the housing 16, it is essential in the embodiment illustrated in Figure 1 that conduit 17 extend through the bottom of housing 16 coincident with an extended rotational axis of chamber 10. As illustrated herein, conduit 17 terminates in conduit 18, which in turn extends axially with respect to the rotational axis of chamber 10 through the bottom of housing 16. Conduit 17 is rotatably connected with conduit 18.

Referring to Figure 2, pebble reservoir 10a is similar to reservoir 10 of Figure 1, except that it is adjustably movable in a lateral direction and the outlet conduit 17a extends from a fixed position in the bottom portion 12 on or near the extended axis of reservoir 10a. Inlet conduits 14 extend into reservoir 10a from a plurality of separate points in a solids mass as discussed in connection with Figure 1. In many instances it is advantageous that the inlet conduits 14 terminate in reservoir 10a at points along an arc of the type described in connection with Figure 1. Reservoir 10a is supported in any desired manner to provide for its lateral movement. In one embodiment this is accomplished by strap hangers 19 attached to the interior of housing 16, or to any other desired point of support. Hinged means 21 are provided to permit reservoir 10a to be moved in a lateral direction and then to be locked in the position moved to. Conduit 22, connected with member 23, is any suitable receiving means for collecting solids discharged from conduit 17a, and for delivering the discharged solids to the desired destination. Gas tight housing 16a can be utilized when desired, to contain reservoir 10a, conduits 14, 17a, and 22, and 23, as shown. When utilizing housing 16a in this manner, any desired means can be utilized for operating hinged adjusting means 21, such as by reaching them from points outside housing 16a through access conduits 20.

With reference to Figure 6, if there were no solids flow through conduits 14b and 14c, contiguous flowable particulate solids introduced into reservoir 10 (or 10a) through conduit 14a would form a mass having a contour, or upper surface resembling a cone with conduit 14a at the apex, as defined by the dotted lines a. Similarly, if solids flow into reservoir 10 (or 10a) were effected only through conduit 14b, a solids mass would be formed therein as defined by the dotted lines b, and if solids were introduced through conduit 14c only, a solids mass would be formed having the surfaces c—c. When the solids are free to flow into the reservoir 10 (or 10a) through each of the conduits 14a, 14b, and 14c, the potentially separate masses a—a, b—b, and c—c, are formed, and as the solids are withdrawn from one or all of these masses, the solids thus withdrawn are replaced by solids incoming from the respective conduits 14a, 14b, and 14c. By adjustably moving the reservoir to position the inlet to conduit 17, as desired, with respect to the outlet ends of conduits 14a, 14b, and 14c, the ratio of solids flow through any one of these conduits (14a, 14b, 14c) with respect to flow of solids through any or all of the remaining conduits is regulated. Accordingly, when the inlet to conduit 17 is disposed directly below the solids conduit 14c pebbles will flow at a higher rate through conduit 14c than through either conduits 14b or 14a. However, as illustrated, a portion of the solids mass b—b will be passed into conduit 17 and some solids flow will take place through conduit 14b, although at a much lower rate than that through conduit 14c. Similarly, substantially no flow of solids will take place through conduit 14a. If now the reservoir 10 (or 10a) is moved to the position 17', it is seen that the largest proportion of the solids flowing through 17' are those introduced into the reservoir through conduit 14b, together with smaller amounts of solids introduced into conduit 17' from both conduits 14a and 14c. Similarly, if the reservoir is adjustably moved to the position 17", the rate of solids flow through 14a will be greater than that through 14b, with substantially no solids flow occurring through conduit 14c. It is believed clearly illustrated in Figure 6 that the ratio of quantities of solids flowing through the conduits 14 in Figure 1, can be regulated and controlled by means of adjustably moving reservoir 10 (or 10a), to dispose the inlet end of conduit 17 with respect to the outlet ends of conduits 14, as described above. Thus, by rotating reservoir 10, or laterally moving reservoir 10a, to adjust the position of the inlet of conduit 17 with respect to the outlet ends of conduits 14, the inlet end of conduit 17 can be disposed to be directly below the outlet end of any one of conduits 14, or in any desired position relative thereto, to effect the desired relative flow through each of these conduits.

Figure 3 is illustrative of a specific utilization of one embodiment of apparatus of my invention in controlling and regulating pebble flow from a plurality of points in a pebble mass, in a pebble heater system. Referring to Figure 3, chamber 31 comprises shell 32 which is closed at its upper end by closure member 33. Pebble inlet conduit 34 and effluent outlet 36 are provided in closure member 33. Closure member 37, which is preferably in the form of a hopper, forms a portion of the bottom closure of shell 32. Wall members 38 extend upwardly from closure member 39, which forms a second closure member in the bottom of shell 32. Wall members 38 extend from the bottom of shell 32 upwardly into a chamber formed within shell 32. Heat material inlet 35 opens into the lower portion of chamber 31 and preferably into that portion within the bottom closure member 37. The wall members 38 disposed farther from heating material conduit inlet extend to points at successively greater heights than does the wall member nearest conduit 35. Wall members 38 preferably extend from wall to wall of shell 32 as parallel cords, or tangents of circles, and on the same side of closure member 37. Reaction chamber 41 comprises shell 42, which is closed at its upper and lower ends by closure members 43 and 44. Quench, or treating chamber 46 extends from the side wall of shell 42 and communicates with the chamber within shell 42 through an opening in a common wall therebetween. Quench chamber 46 comprises shell 47, which is closed at its end away from chamber 41 by closure member 48. Effluent outlet conduit 49 is provided in the upper end portion of chamber 46. Pebble conduits 51 extend between the open top chamber portions, formed within chamber 31 by wall members 38, to the top side of quench chamber 46. Pebble conduits 52 extend between points disposed along the length of the bottom side of quench chamber 46 and the upper portion of pebble collector 53. Bottom closure 54 of pebble collector 53 is rotatably affixed thereto. Pebble conduits 52 extend into the top of pebble collector 53 and terminate along an arc having an axis which coincides with the rotational axis of rotatably affixed bottom closure member 54. Pebble outlet conduit 56 in bottom closure member 54 is offset from the rotational axis of bottom closure member 54. The ends of conduits 52 must be positioned far enough above pebble outlet conduit 56 to permit natural pebble flow from all the conduits 52 into conduit 56 for at least one rotational position of bottom closure member 54. To assure natural pebble flow, the ends of conduits 52 terminate on an arc which is positioned at least 5/8 of the arc radius, in a vertical distance above the pebble outlet from the pebble collector. Conduit 57 together with swivel joints 58 and 59 comprise a flexible displacement member extending between pebble outlet conduit 56 and pebble conduit 61. Pebble conduit 61 extends from swivel joint 59 into a lower end portion of elevator 62. Heating material inlet conduit 35 is provided in the lower portion of shell 32, and in that portion of the chamber which is closed by bottom closure member 37. Reactant material inlet conduit 63 is provided in the lower portion of reactor chamber 41. Pebble outlet conduit 64 extends between bottom closure member 44 and a lower end portion of elevator 36. Elevator 62 is connected at its upper end to pebble inlet conduit 34.

In the operation of the apparatus of Figure 3, pebbles are introduced into the upper end of chamber 31 through pebble inlet conduit 34. The pebbles form a flowing contiguous bed within chamber 31 and flow downwardly through that chamber. Heating material, such as hot combustion gases, is introduced into the lower portion of chamber 31 through heating material inlet conduit 35. The hot gas is passed upwardly through the pebble bed and removed from chamber 31 through conduit 36. A portion of the pebble mass within chamber 31 passes into the open upper end of each of the chamber portions bordered by wall members 38. The chamber portion which is closest to pebble outlet conduit 40 has its inlet disposed at the least height within chamber 31. The pebbles which pass into that chamber portion therefore contact the hottest heat exchange material in chamber 31, and are therefore at a relatively high temperature. Pebbles are passed into open ends of the chamber portions which are successively disposed farther from the heating material inlet conduit 35 and are at successively lower temperatures, for the reason that their contact time with the heat exchange materials is less because the pebbles are protected from the flow of the heating materials by the innermost wall member forming the successive chamber portions, and for the further reason that the heat exchange material tends to have its temperature reduced as it progresses farther from its inlet point. The heated pebbles are passed through conduit 40 into chamber 41 and form a flowing contiguous pebble mass therein. Closure member 43 is preferably sloping so that no free space is encountered between the top of the pebble bed within chamber 41 and closure member 43. Pebbles from the open top chamber portions within chamber 31 pass by means of conduits 51 into quench chamber 46 and form contiguous pebble beds in chamber 46, which have vertical interfaces therebetween. Reactant materials are introduced into the lower portion of chamber 41 through conduit 63, and flow upwardly through that chamber countercurrent to the flow of pebbles therein. The hot pebbles provide the necessary heat for reaction of the reactant materials. Resulting reaction products flow upwardly and laterally from chamber 41 into chamber 46, and flow transversely through the plurality of contiguous pebbles beds of successively lower temperatures. In this manner hot gases passed from chamber 41 are quenched and are removed from the upper end of chamber 46 through effluent conduit 49.

Pebbles which have been cooled in the reaction within chamber 41 are removed therefrom through pebble outlet conduit 64 and discharged to elevator 62 for return to chamber 31 through conduit 34. Pebbles from quench chamber 46, which are heated in the quenching process, are withdrawn from that chamber through conduits 52, and are passed into pebble collector 53. By rotating bottom closure member 54 of pebble collector 53 to a desired point, pebble outlet conduit 56 is disposed closer to a portion of pebble conduits 52 on their arc than to the remaining portion of pebble conduits 52. Flow of pebbles from conduits 52, which are closer to conduit 56 than the other conduits 52, is facilitated thereby while the flow from conduits 52, which are farther away, is retarded. In this manner flow of pebbles at different temperatures from a plurality of predetermined selected points in the pebble mass in chamber 31, is regulated to provide a desired temperature gradient across quench zone 46, to effect the required quench of effluent product from chamber 41.

Figure 4 is illustrative of still another specific utilization of apparatus of my invention in controlling and regulating pebble flow from a plurality of predetermined points in a pebble mass in a pebble heater system. Referring to Figure 4, pebble heating chamber 70 is provided in its upper portion with a pebble inlet conduit 71 and an effluent outlet conduit 72. Pebbles are passed into the upper portion of pebble heating chamber 70 through conduit 71 and flow downwardly and outwardly to form a fluent pebble mass within chamber 70. Extending upwardly through the bottom portion of chamber 70 to a position intermediate the ends of that chamber, is pebble outlet conduit 73. Pebble outlet conduit 74 is provided in the bottom of chamber 70, and is disposed about conduit 73 so as to form an annular space therebetween. Conduit 76 is provided so as to supply heating material to the lower portion of pebble heating chamber 70. A second conduit 77 is provided intermediate the ends of chamber 70 and substantially on a plane with the upper end of pebble outlet conduit 73 so as to provide additional heating material as desired. A first reaction chamber 78 is provided in its upper end portion with a pebble inlet conduit 79 and an effluent outlet conduit 81. Chamber 78 is provided in its lower end portion with pebble outlet conduit 82 and reactant material inlet conduit 83. A second reaction chamber 84 is provided in its upper end portion with pebble inlet conduit 86 and effluent outlet conduit 87. Chamber 84 is provided in its lower end portion with pebble outlet conduit 88. Pebble conduit 89 extends between pebble outlet conduit 74 and pebble inlet conduit 79. Pebble conduit 91 extends between pebble outlet conduit 73 and pebble inlet conduit 86. Elevator 90 is provided to elevate pebbles from reaction chambers 78 and 84 to the upper portion of pebble heater chamber 70 through conduit 71.

Pebble conduits 82 and 88 conduct a flow of pebbles through reaction chambers 78 and 84, and terminate in a flow controller apparatus of my invention of the type such as illustrated in Figures 1, 2, or 3. The pebble reservoir, means for movably adjusting the reservoir, the position of outlet conduit 92, with respect to the terminating ends of conduits 82 and 88, are illustrated diagrammatically as being contained in gas-tight housing 16, and are understood in the light of the discussion hereabove, with reference to Figures 1, 2, and 3. Conduit 92 conducts the flow of pebbles from the flow controller apparatus of my invention diagrammatically illustrated with reference to housing 16, to elevating means 90.

In the operation of the apparatus of Figure 4, pebbles are heated in chamber 70 in contact with combustion gases in a manner described in connection with the apparatus of Figure 3.

The hottest pebbles in chamber 70 are adjacent the bottom end of the chamber, and pebbles at successively higher positions in the chamber are at successively lower temperatures. The hottest pebbles are withdrawn from the bottom of pebble heating chamber 70 through conduit 74, and are passed by means of conduits 89 and 79 to the upper portion of reaction chamber 78. Pebbles which are at a lower temperature than those withdrawn through conduit 74, are removed through conduit 73 and passed through conduits 91 and 86 into the upper portion of chamber 84. Gaseous materials which are to be heated, treated, or converted in reaction chambers 78 and 84, are passed into these chambers through inlet conduits 83 and 85 respectively, and treated in chambers 78 and 84 at desired temperature conditions different from each other. Effluent gases are withdrawn from each of chambers 78 and 84, through conduits 81 and 87 respectively. Pebble flow from chambers 78 and 84 is conducted through conduits 82 and 88 respectively, which terminate in a flow control apparatus of my invention, diagrammatically illustrated as being in housing 16, and illustrated specifically and in detail in each of Figures 1, 2, and 3, discussed above. In this instance, conduits 82 and 88 represent conduits 14 of Figures 1 and 2.

The temperature level of the thermal treatment conducted in each of chambers 78 and 84 is dependent on the temperature of the pebble mass introduced through each of conduits 74 and 73 respectively, and the rate of withdrawal of pebbles at those predetermined selected points within the pebble mass in chamber 70.

Control of the pebble flow through chambers 78 and 84 from these predetermined points within the pebble mass in chamber 70, is effected by the apparatus of my invention, as represented diagrammatically by housing 16. Accordingly, the position of the outlet ends of conduits 82 and 88, in housing 16, with respect to the inlet of a pebble outlet conduit in a pebble reservoir therein operatively connected with conduit 92, is adjusted either by rotating the reservoir, or at least a bottom portion thereof to a predetermined extent, or by adjustably moving it in a lateral direction. The rate of pebble flow from selected portions within a single heated pebble mass is thereby controlled to provide hot pebbles from a plurality of simultaneous thermal treatments in separate chambers, at different temperature levels.

As will be evident to those skilled in the art, various modifications can be made or followed, in the light of the foregoing disclosure and discussion, without departing from the spirit or scope of the disclosure or from the scope of the claims.

I claim:

1. Apparatus for regulating flow of pebbles from separate points in a pebble system, comprising a rotatable vertically disposed cylindrical pebble reservoir having an open top and a closed bottom, a first conduit in said closed bottom offset from the rotational axis of said reservoir, a plurality of second conduits in communication with pebbles at said separate points in said pebble system and extending downwardly into said reservoir through its open top and terminating at equal vertical distances from the upper end of said first conduit along a locus of points describing an arc not exceeding 180° and having an axis common with the rotational axis of said reservoir and spaced at said vertical distance of at least ⅝ of the arc radius, and means for adjustably rotating said reservoir.

2. The apparatus of claim 1 wherein said reservoir, and at least a portion of said first conduit, and the lower ends of said second conduits are disposed inside a gas-tight housing.

3. The apparatus of claim 1 wherein the contour of said closed bottom describes a modified cone having its apex offset from the rotational axis of said reservoir and said first conduit extends through said apex.

4. Apparatus for regulating flow of pebbles from separate points in a pebble system, comprising a laterally movable cylindrical pebble reservoir having an open top and a closed bottom, a first conduit in said closed reservoir bottom, a plurality of second conduits in communication with pebbles in said pebble system at said separate points and extending downwardly into said reservoir through its open top and terminating in an arc coaxial with said reservoir and not exceeding 180° at a vertical distance from said closed bottom of at least ⅝ of the arc radius, means for laterally moving said reservoir and locking same in the position moved to, said plurality of conduits disposed in said reservoir a predetermined distance from the side walls thereof so as to provide laterally moving said reservoir to regulate the position of said first conduit with respect to the ends of each of said second conduits.

5. The apparatus of claim 4 wherein said reservoir and at least a portion of said first conduit, and the lower ends of said second conduits are disposed inside a gas-tight housing.

6. Apparatus for regulating flow of pebbles from separate points in a pebble system comprising an adjustably movable reservoir, means for adjustably moving said reservoir, a plurality of first conduits in communication with pebbles at said separate points in said pebble system and extending downwardly from each of such separate points and opening into an upper portion of said reservoir, the open ends thereof being horizontally displaced from each other and arranged in an arc and terminating therein, a second conduit extending downwardly from a lower portion of said reservoir to an outside point and adapted to have its upper end laterally adjustably positioned with respect to the arc upon which each of said first conduits in said reservoir is positioned.

7. In a pebble heater system, apparatus for controlling the flow of pebbles from a pebble mass in said system at a plurality of predetermined points therein, comprising a pebble collector having a rotatably mounted bottom, a plurality of stationary pebble conduits extending from predetermined separate points in said pebble mass into said collector, a pebble outlet conduit in said rotatably mounted bottom offset from the rotational axis of said bottom, said stationary conduits terminating in said collector on an arc located a vertical distance equal to at least ⅝ the radius of said arc above said pebble outlet conduit and said arc having an axis common with the rotational axis of said rotatably mounted bottom.

8. An improved pebble heater apparatus, comprising a pebble heating chamber; a reaction chamber positioned below said heating chamber; a pebble throat conduit interconnecting said heating chamber and said reaction chamber; said chambers and said throat containing a contiguous mass of pebbles; means for introducing hot heat exchange gases in contact with pebbles in said heating chamber; pebble inlet means in an upper portion of said heating chamber; gas outlet means in an upper portion of said heating chamber; gas inlet means and effluent gas outlet means in said reaction chamber; an adjustably movable pebble reservoir positioned below said reaction chamber and means for adjustably moving said pebble reservoir; a plurality of first pebble conduits extending downwardly from said reaction chamber into an upper portion of said pebble reservoir and terminating therein and in communication at their upper ends with pebbles in said reaction chamber at predetermined separate points therein; a second pebble conduit extending downwardly from a lower portion of said reservoir to an outside point and disposed to have its upper end adjustably positioned with respect to the lower ends of each said first conduit when said reservoir is adjustably moved, and elevating means interconnecting said second pebble conduit at said outside point with said pebble inlet means in said heating chamber.

9. An improved pebble heater apparatus, comprising a pebble heating chamber; a treating chamber positioned below said heating chamber; a pebble throat conduit means interconnecting said heating chamber and said treating chamber; said chambers and said conduit means containing a contiguous mass of pebbles; means for introducing hot heat exchange gases in contact with pebbles in said heating chamber; pebble inlet means in an upper portion of said heating chamber; gas outlet means in an upper portion of said heating chamber; gas inlet means and effluent gas outlet means in said treating chamber; an adjustably movable pebble reservoir positioned below said treating chamber and means for adjustably moving said pebble reservoir; a plurality of first pebble conduits extending downwardly from said treating chamber into an upper portion of said pebble reservoir and terminating therein and in communication at their upper ends with pebbles in said treating chamber at predetermined separate points therein; a second pebble conduit extending downwardly from a lower portion of said reservoir to an outside point and disposed to have its upper end adjustably positioned with respect to the lower ends of each said first conduit when said reservoir is adjustably moved, and elevating means interconnecting said second pebble conduit at said outside point with said pebble inlet means in said heating chamber.

10. Apparatus for regulating flow of pebbles from separate points in a pebble system, comprising a rotatable reservoir; means for rotating said reservoir; a plurality of first conduits in communication with pebbles at said separate points in said pebble system and extending downwardly from each of said separate points and opening into said reservoir, and terminating therein; a second conduit extending downwardly from a point in said reservoir below the ends of terminated first conduits therein, to an outside point, and adapted to have its upper end positioned out of register with at least one of the said terminated ends to preclude pebble flow therethrough, in response to rotation of said reservoir.

References Cited in the file of this patent

UNITED STATES PATENTS

| | | |
|---|---|---|
| 1,187,324 | Ibberson | June 13, 1916 |
| 1,434,660 | Lehrack | Nov. 7, 1922 |
| 2,436,624 | Volk | Feb. 24, 1948 |
| 2,505,257 | Quigg | Apr. 25, 1950 |
| 2,548,285 | Bergstrom | Apr. 10, 1951 |